Feb. 12, 1935.  E. W. GUERNSEY ET AL  1,990,602

PROCESS FOR PURIFICATION OF SULPHUR

Filed Oct. 2, 1928

Inventors
Ernest W. Guernsey and
Richard E. Vollrath.
By Cameron, Kirkam and Sutton.
Attorneys Patented Feb. 12, 1935

1,990,602

UNITED STATES PATENT OFFICE 1,990,602

PROCESS FOR PURIFICATION OF SULPHUR

Ernest W. Guernsey and Richard E. Vollrath, Baltimore, Md., assignors to Consolidated Gas Electric Light and Power Company of Baltimore, Baltimore, Md., a corporation of Maryland Application October 2, 1928, Serial No. 309,797

27 Claims. (Cl. 23—229)

This invention relates to a process and apparatus for the purification of sulphur, and more particularly to a novel and improved process and apparatus for the separation of sulphur from mixtures in which the sulphur occurs in a finely divided state, although one embodiment of the invention may be used for the purification of sulphur and impurities in any proportion with any degree of fineness of particles of sulphur and impurities.

One example of an impure sulphur mixture on which the process has been used successfully is the material produced in the removal of hydrogen sulphide from gases such as coal gas and water gas by passing the gas through an alkaline solution containing a catalytic material in suspension. After absorption of the hydrogen sulphide the solution is aerated, producing free sulphur which, when removed, carries with it an appreciable percentage of the catalytic material and various alkali salts. The following analyses show typical compositions of the solids in the sludge or slurry so obtained, the second analysis corresponding to a material which has been washed to reduce the content of soluble salts.

|  | I Unwashed | II Washed |
|---|---|---|
| Sulphur | 65.48 | 78.86 |
| Iron oxide | 7.70 | 7.76 |
| Silica | 2.41 | 3.21 |
| Alumina |  | 2.65 |
| Lime |  | .31 |
| Sodium thiosulphate | 17.48 |  |
| Sodium thiocyanate | .93 |  |
| Sodium bicarbonate | 2.44 |  |
| Total sodium salts |  | 6.4 |
| Undetermined | 3.56 | .81 |

In the purification of sulphur it has been proposed to melt the impure sulphur in a closed container and wash out the impurities by agitation with hot water under sufficient pressure to raise the boiling point above the melting point of sulphur. Such methods as heretofore proposed, however, are inefficient or inapplicable to treat material of the character above referred to, since the size of the sulphur particles, and the character and quantity of the impurities, retard or prevent the agglomeration of the sulphur particles and the separation of the sulphur as a free-flowing liquid. Furthermore, the violent agitation or intermingling which it has been proposed to employ in order to remove the impurities from the sulphur and to prevent the larger particles of impurities from settling out of the supernatant washing liquid has been found to promote a dissemination of sulphur droplets throughout the washing liquid whereas it is desired that the total quantity of sulphur finally accumulate in one body.

One obect of the invention is therefore to provide a new and improved process and apparatus for the rapid separation of sulphur in a state of commercial purity from mixtures of sulphur with impurities, whether said mixture is dry or in fluid suspension.

Another object is the provision of such a process which is capable of separating the sulphur from impurities of such character and quantities as to prevent direct melting of the impure sulphur to a free-flowing liquid.

Another object is to provide such a process which will efficiently separate the sulphur from the impurities whether the impurities are lighter or heavier than molten sulphur.

Another object is to provide such a process which removes the impurities efficiently whether they are coarse or finely divided.

Another object of the invention is to provide suitable washing liquids having the properties requisite for efficiently performing their function in the novel process.

Another object is to provide such a process in which the washing liquids may be recovered and used repeatedly, and in which the heat imparted thereto may be conserved.

Another object is to provide such a process in which an accompanying catalytic material may be recovered and used repeatedly.

Another object of the invention is the provision of suitable apparatus for efficiently carrying out the process.

Other objects and advantages will be in part obvious, and will appear from the following description of the invention, taken in connection with the accompanying drawing which illustrates suitable forms of apparatus for carrying out the invention.

In the drawing,—

Figure 1:
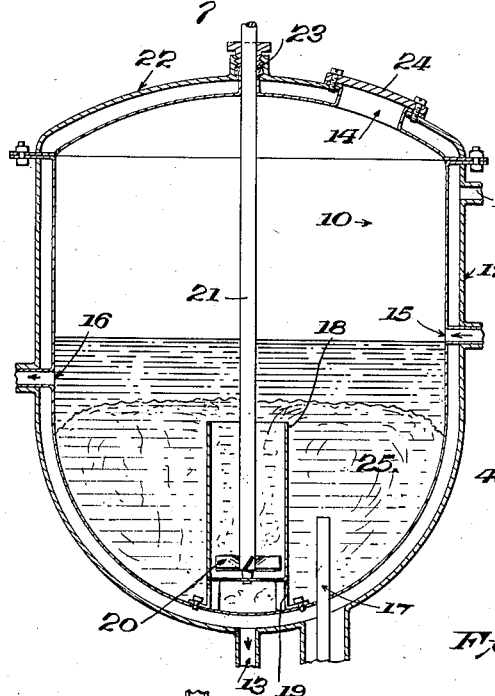
Fig. 1 is a vertical section through one form of apparatus suitable for carrying out the process.

In dealing with materials of the character above referred to, many experiments were made in attempts to obtain molten sulphur by direct melting, either alone or in the presence of water. It was found that if the impurities were less than about 15%, depending on their character and fineness, it was possible to melt the impure sulphur to a free-flowing liquid containing the impurities in suspension. However, when it was attempted to wash the impurities out of the sulphur by agitation with hot water so vigorous as to cause actual intermingling of molten sulphur and water as heretofore proposed, it was found that the sulphur became dispersed throughout the suspension of impurities in the washing liquid and could not thereafter be easily agglomerated into a single body of pure molten sulphur. The droplets of sulphur so mixed in the wash water were hindered from reentering the poll by the surface tension between the sulphur and the water, and by the presence of finely divided dirt in the water, so that a quantitative separation of the sulphur from the impurities was slow and difficult to obtain.

On the other hand, when the impure sulphur of the approximate composition shown in Analysis II above was mixed with water in the form of a slurry and it was attempted to melt out the sulphur therefrom, it was found that while some growth to small visible globules of molten sulphur occurred, no quantitative separation of the sulphur into a single large pool was obtained.

It has now been discovered, however, that although the small sulphur particles of the impure sulphur mass do not readily coalesce when the mass is heated to a temperature higher than the melting point of sulphur, they do add to or dissolve in a pool of molten sulphur of appreciable extent when brought into proper contact with said pool, and further, that the merging of two bodies of molten sulphur both of which are in contact with a washing liquid, may be facilitated by choosing a washing liquid, the surface tension of which towards sulphur is as low as practicable.

Various ways have been developed for putting this discovery to useful advantage. For example, a suspension of impure sulphur in a suitable liquid, preferably preheated to a temperature above the melting point of sulphur, may be brought into contact with the surface of a molten sulphur pool. The small sulphur particles or globules in the suspension thereupon merge into the pool, while the impurities remain in the liquid in which the impure sulphur was suspended. This liquid must of course be so chosen, having regard for the nature of the impurities, that the particles remain in suspension in the liquid and do not enter the sulphur pool. In some instances there are certain advantages to working with such a slurry as here contemplated, rather than with the material in a dry state. Important among these, is the fact that in certain cases, as in the liquid purification of gas, the impure sulphur is produced as a slurry, and to purify it in that state directly avoids a drying step. Furthermore, working with a suspension of the impure sulphur in a liquid may permit of more ready introduction of the impure sulphur against the pressure which will exist in the purification apparatus when a washing liquid is used which boils at a temperature lower than the melting point of sulphur as will be the case for most of the washing liquids contemplated.

If the material contains a relatively small amount of water or can be put into this condition at low cost, it will sometimes be advantageous to dissolve the relatively dry impure sulphur, preferably but not necessarily preheated, directly into the pool of molten sulphur in an amount small enough so that the pool retains its fluidity, and thereafter wash the molten sulphur containing these impurities by a washing liquid of such a nature that the particles of impurities will leave the molten sulphur and enter the washing liquid. The amount of water which the sulphur may contain and still melt freely into the molten sulphur depends on the fineness of division of sulphur and on the extent and character of the impurities. In the case of the finely divided sulphur referred to above the limiting amount of water is about 15%.

A very careful study has been made of the properties which the washing liquid must have. These properties are much the same whether this liquid is to be used to retain the impurities in suspension while the sulphur is dissolved from a slurry into the pool, or to wash out the impurities from molten sulphur after first dissolving relatively dry impure sulphur in a molten sulphur pool.

In the first place, since molten sulphur has a density of about 1.8 which is intermediate between the density of most impurities to be removed from sulphur, and of most available washing liquids, it is evident that if the impurities are to go into the lighter and hence uppermost washing liquid, or to stay there in case a slurry is used, the particles must be wet by this liquid more strongly than by molten sulphur. Also, it may be seen that since, in order for the small sulphur globules of the suspension to merge with the main body of the sulphur, they must penetrate the surface film at the interface between the washing liquid and the sulphur phases, it is desirable that the washing liquid have as low a surface tension toward sulphur as practicable.

The principle involved may be illustrated by a simple experiment. If, in a sealed tube containing molten sulphur in the bottom and water above it, there is introduced into the water phase, a small droplet of molten sulphur, so that this droplet falls slowly down to the interface between the water and the sulphur, the small droplet does not merge with the pool unless the test tube is shaken or bounced in such a way as to cause the particle to break its way through the water surface. If the experiment is repeated, however, with some liquid having a surface tension appreciably lower than water, as for example, one percent aqueous soap solution, or a .05 percent saponin solution, the droplet merges readily, its own weight being sufficient to push it through the weakened film at the surface of the liquid. In the present invention we propose to take advantage of the phenomena here illustrated, and to use a washing liquid which, while wetting the particles of impurities more strongly than these particles are wet by molten sulphur, at the same time has as low a surface tension toward sulphur as practicable, in order to reduce the resistance to merging of the small particles of molten sulphur existing when the impure sulphur is at a temperature above the melting point of sulphur.

It may be seen also that a further desirable property for this washing liquid is a density greater than molten sulphur. This is especially to be desired in the case of materials containing particles too large to be drawn from the sulphur or held in the washing liquid solely by preferential wetting. Moreover, it is desirable that the washing liquid, if possible, should have a boiling point higher than the melting point of sulphur in order to avoid use of pressure apparatus in the purification, and the washing liquid should also wet the impurities more strongly than they are wet by molten sulphur, in order that the very fine impurities as well as the coarser particles may be drawn into the washing liquid.

It has been found possible to secure each of the forementioned special properties in actual liquids. Some of these possess more than one of the enumerated special properties. It should be distinctly understood that water may be successfully used in the process, but there are certain technical advantages to the use of these special washing liquids, and the circumstances connected with each individual case will determine whether it is in the long run more economical to use water or other more expensive washing liquids. Experiments have been made which demonstrate conclusively that with a one percent soap solution a much faster, and in some cases more complete, separation of sulphur from its impurities is possible. This is believed to be due principally to the reduction of surface tension. As further evidence that reduction of surface tension does favor the separation, it was found that .05 percent solution of saponin gave distinctly better results than pure water, and so far as known, the only effect of the small amount of saponin is to greatly lower the surface tension.

Numerous substances dissolve in water to give a solution having a boiling point higher than the melting point of sulphur. As an example may be cited the solution of calcium chloride saturated at about 35° C. which contains about equal parts of calcium chloride and water, and which boils at about 130° C. This solution has a specific gravity of only 1.5 and hence floats on top of the sulphur phase. Experiments have been made with this solution in an open vessel in which practical recoveries of commercially pure sulphur from impure sulphur have been obtained.

One washing liquid of high density suitable for the treatment of impure sulphur containing coarse particles of impurities is a solution of zinc chloride saturated at ordinary temperatures which has a density greater than molten sulphur. This solution also preferentially wets particles of impurities of an earthy character. A still further advantage of this solution is that its boiling point is higher than the melting point of sulphur, so that the purification operation may be sucessfully carried out without resorting to pressure apparatus. Experiments were made with this solution in which practically complete separation of sulphur from its impurities was effected, these experiments being made at ordinary pressures in an open vessel.

A further advantage of the use of washing solutions which are denser than molten sulphur and which also have a boiling point above the melting point of sulphur, is that due to the fact that the molten sulphur is above the washing liquid, it becomes simple to carry out the washing simultaneously with the dissolving of dry sulphur into molten sulphur, making possible a practically continuous process with a very simple apparatus. It is only necessary to discontinue the addition of the impure sulphur for a short time before withdrawing pure sulphur in order to permit the final purification.

Of equal importance with the choice of the washing liquid to be used, is an understanding of the type of agitation of the sulphur and washing liquid phases to be used. In the first place, it is essential that all parts of the suspension of impure sulphur in the slurry be brought into contact with the molten sulphur pool or in the case of the alternative procedure, that all parts of the impure molten sulphur be brought in contact with the washing liquid. It is, however, of greatest importance that this contact of different portions of the two phases be accomplished without extensive commingling of the two phases. If during the agitation, small portions of the sulphur phase break off, and are disseminated through the washing liquid, it is only with difficulty that they get back into the sulphur phase, especially if the washing liquid contains a very high percentage of suspended solid impurities. The net result of this action is that finally an equilibrium is established in which as much sulphur is being broken off from the pool as is merging with the pool, and the net recovery of sulphur from the impure sulphur is unsatisfactory. It is also found that the walls and bottom of the apparatus are usually wet by washing liquid containing impurities so that when purification of the sulphur is completed the pure sulphur pool may be surrounded by an envelope of impurities in washing liquid. It is therefore desirable that the sulphur outlet be so situated that sulphur is drawn always from the interior of the pool. Apparatus has been developed which is adapted to carry out the novel process while fulfilling the above enumerated conditions, and certain preferred forms thereof are illustrated in the accompanying drawing and will now be described in detail.

Fig. 1 illustrates more or less diagrammatically a steam-jacketed kettle or separator 10 having a steam inlet 11 to a suitably lagged jacket 12, and an outlet 13 therefrom. The separator is provided with an opening 14 for the introduction of the impure sulphur, an inlet 15 for the washing fluid, an outlet 16 for the washing fluid, and a steam-jacketed outlet 17 for the sulphur which is made to project into the interior of the vessel in order to insure that the molten sulphur withdrawn is taken from the interior of the pool. A cylinder 18 is fixed centrally to the bottom of the separator in any suitable manner, and extends upwardly to within a short distance below the outlet 16. The cylinder 18 has openings 19 formed at its base, and a circulating device 20 in the form of a propeller of any suitable form is journaled to rotate within the cylinder 18 in a direction to draw the molten sulphur up through the cylinder and cause it to emerge at the top thereof. The shaft 21 of the propeller 20 extends outwardly through a suitable stuffing box 23 in the cover 22 of the separator, and is adapted to be rotated by any appropriate means, not shown.

In operation, a quantity of sulphur of sufficient purity to melt directly is first melted in the bottom of the separator by means of steam of the proper pressure introduced into the jacket at the inlet 11. A quantity of impure sulphur, the exact amount depending upon the amount of sulphur previously melted in the vessel, and on the percent of impurities in the impure sulphur, is introduced through the opening 14 and the closure 24 therefor securely applied. This opening or inlet may of course be of a more complicated design than shown, for example, a bell and hopper arrangement which would permit the introduction of the sulphur without the release of the inside pressure might be used. The added impure sulphur, which was preferably preheated, dissolves in the molten sulphur already present, this process being aided by the rotation of the propeller 20 pulling liquid through the cylinder 18 and thoroughly mixing the same. When the mixing is complete, and the liquid is homogeneous, the washing liquid, also preferably preheated above the melting point of sulphur, is introduced at 15 and the stirring of the mass of sulphur 25 by means of the propeller 20 is continued until practically all of the impurities have been transferred from the sulphur to the washing liquid. If the particles of impurities are not very fine it is desirable to provide a stirring device in the washing liquid to hinder the settling of the impurities onto the interface. The completion of the washing may be gauged by experience or by tapping off small quantities of sulphur from the pool from time to time. The suspension and solution of impurities in the washing liquid is then flushed out through the outlet 16. If the percent of impurities in the sulphur is quite high, it may be desirable to complete the washing by the addition of a further quantity of fresh washing liquid and additional stirring and flushing out the additional washing liquid. Thereafter sulphur is withdrawn in the molten state through the steam-jacketed outlet 17 from the interior of the pool, until by means of a level indicator (not shown), the level of the sulphur pool is known to be at the point at which it stood on melting the original pool of sulphur. The apparatus is then ready for a repetition of the cycle. The withdrawn suspension of washing liquid may be discarded or treated for the recovery of valuable materials contained therein, as desired.

Figure 2:
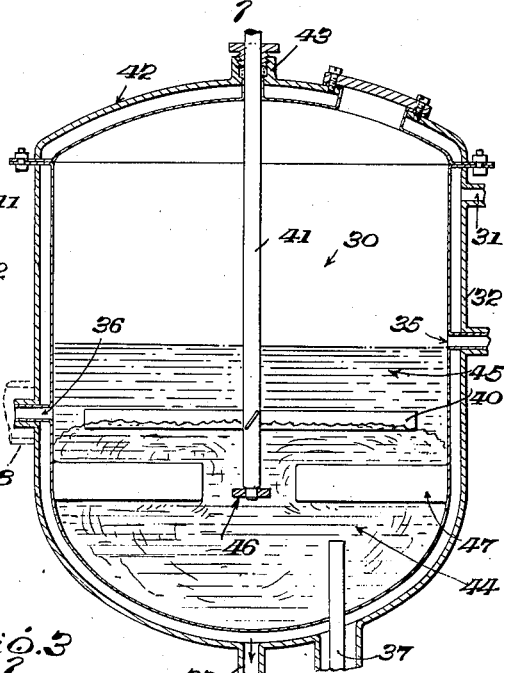
Fig. 2 is a vertical section through one form of apparatus for carrying out the process in a somewhat different manner.

The apparatus illustrated in Fig. 2 is designed more particularly for carrying out the process when the impure sulphur is introduced with the washing liquid as a slurry rather than in the dry state as previously described. The separator 30 is in general similar to the separator 10 previously described, and comprises a closed kettle having a suitably lagged steam-jacket 32 provided with a steam inlet 31 and outlet 33, the kettle being provided with an inlet 35 and an outlet 36 for the slurry, and a steam-jacketed outlet 37 for the pure sulphur. In this case, however, the stirring device comprises long inclined paddles 40 mounted on a vertical rotating shaft 41 and adapted to rotate slowly in the interface between the molten sulphur 44 and the slurry 45 in such a way that the blanket of impurities which tends to settle at the bottom of the washing liquid and interfere with access of sulphur globules to the pool is in effect plowed down into the sulphur pool and turned over, so as to ultimately bring all of the sulphur particles in contact with the pool. The vertical rotating shaft is suitably journaled in a bearing 46 at its lower end, and passes through a suitable stuffing box 43 in the cover 42 of the separator 30. Suitable baffles 47 may also be provided near the top but within the sulphur pool 44 to prevent the main part of the pool from following the motion of the paddles 40.

In operation a quantity of comparatively pure sulphur is melted in the separator to form a pool, the impure sulphur and the washing fluid are mixed and preferably preheated and then introduced through the opening 35 as a slurry above the pool 44 of molten sulphur, and the paddles 40 are rotated until the sulphur has been abstracted from the slurry and has joined itself to the pool of pure sulphur. During this operation sulphur may be drawn out from time to time through the outlet 37 in order to maintain the level of the interface between the pool of sulphur and the slurry at the proper point with regard to the paddles 40. When the separation is complete the washing fluid is flushed out through the opening 36 and the operation repeated.

When dissolving sulphur from the suspension of the impure sulphur, it is important to determine what is the best proportion of washing liquid to impure sulphur to use. This will depend on the extent and character of the impurities, the fineness of division of the sulphur, and on the washing fluid used. It is found, for example, that for sulphur having the Analysis II above given, and using water as the washing fluid, a suitable proportion is about three parts of water to one part of impure sulphur.

Figure 3:
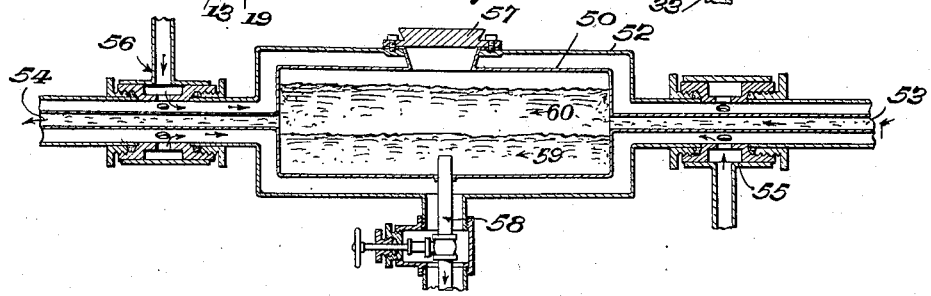
Fig. 3 is a vertical section through still another form of apparatus adapted to carry out the process.

Another form of apparatus in which the invention may be practiced is shown diagrammatically in Fig. 3. The apparatus comprises a cylindrical container 50 having a suitable steam-jacket 52 and having hollow trunnions 53 and 54 which are also steam-jacketed as indicated at 55 and 56. The container is also provided with an opening 57 and a steam-jacketed outlet 58.

This apparatus is suitable for use whether the impure sulphur is introduced in the dry state or as a slurry with the washing liquid. In either case, sufficient pure sulphur is first melted in the container to form a pool therein. If the sulphur is to be introduced in the solid state, it is then introduced through the opening 57, which is thereupon closed, and the cylinder is rotated until the impure sulphur has become incorporated in the pool. The washing liquid is then introduced through the hollow trunnion 53 and agitation is continued until the impurities have been washed from the sulphur pool and may then be flushed out through the hollow trunnion 54, while the excess sulphur is removed through the outlet 58. During the process of separation, the cylindrical vessel is rotated at such a rate as to cause a rippling action at the interface of the sulphur phase 59 and the washing liquid phase 60, sufficient to cause the requisite intimate contact between the two phases at their interface to secure the separation of the impurities from the sulphur pool without causing portions of the sulphur pool to be broken off and retained in suspension in the washing fluid.

In case the impure sulphur is introduced as a slurry with the washing liquid, it is introduced through the hollow trunnion 53 and agitated as above described in contact with the molten sulphur pool until the sulphur globules have passed from the suspension into the pool leaving the impurities suspended in the washing liquid. The agitation caused by the rotation of the cylindrical vessel at the proper rate tends to hold the impurities in suspension throughout the body of the washing liquid and to minimize any detrimental effect of such increased concentration of impurities toward the bottom of the washing liquid as may occur, by causing the liquid to roll over and over so that the sulphur globules are brought in contact with the sulphur pool.

In case a washing liquid is used which is heavier than molten sulphur, such as the saturated solution of zinc chloride above described, the outlets of the separator will preferably be modified somewhat for that purpose. Referring, for example, to Fig. 2 of the drawing, the outlet 37, which now becomes the outlet for washing liquid, will not need to be steam-jacketed, and will not extend above the bottom of the separator, in order to allow the complete withdrawal of the washing liquid; whereas the outlet 36, which becomes the outlet for purified sulphur will be provided with a suitable steam-jacket such as indicated in dotted lines at 48. It is obvious also that when a washing liquid is used which does not boil at the melting point of sulphur, the stuffing box 43 may be omitted if so desired, since the separation will be effected at atmospheric pressure.

Similarly, if the heavy washing liquid be used in the rotating cylinder shown in Fig. 3, the outlet 58 will not be extended into the cylinder, and will not need to be provided with a steam-jacket.

In operation, the heavy washing liquid is usually used repeatedly in order to conserve the salts therein, and if the impure sulphur contains soluble salts they are preferably washed out before the separation of the insoluble impurities in order to prevent a change in the composition of the heavy washing liquid.

Figure 4:
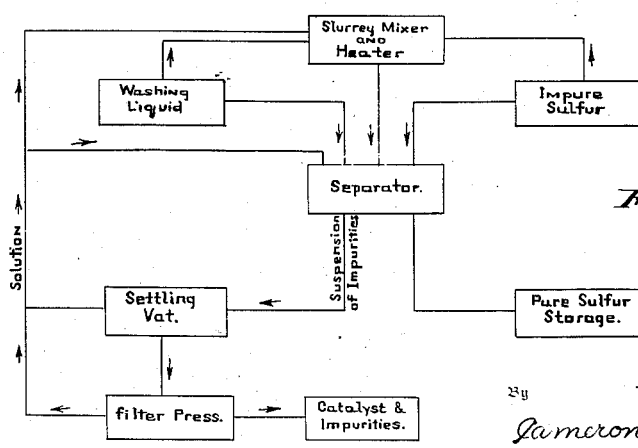
Fig. 4 is a flow diagram indicating the preferred sequence of steps in the process and certain possible modifications thereof.

Fig. 4 is a flow diagram which indicates a number of ways in which the various materials entering into this process may be manipulated. It will be seen by reference thereto that the impure sulphur and washing fluid may be introduced directly into the separator, or they may be first mixed, or mixed and heated, and then introduced into the separator as a slurry. It will also be seen that the catalytic materials may be drawn from a settling vat and used again in the gas purification process, which is a further advantage of the purification process herein described. It will further be seen that the solution remaining after the catalytic agent has been settled out may, if desired, be reused in the separation of sulphur from its impurities. The sediment may be filter-pressed to remove the remainder of the washing liquid which may be returned to the process, and the catalyst may be recovered from the press-cake.

One advantage of proceeding in this way is that by the use of proper insulation for the container and piping, it should be possible to return the solution hot to the separator, thus conserving heat. In case certain of the washing liquids contemplated, as for example soap solution or zinc chloride solution, are used, it will no doubt be desirable from a cost standpoint to use the solution over a number of times.

While the present invention has been disclosed and described in detail, it is to be understood that the invention is not to be limited to the exact details here given, but may be embodied in other forms, and certain features may be used without other features without departing from the spirit of the invention. Reference is therefore to be had to the claims appended hereto in order to define the scope of the invention.

What is claimed is:

1. A process for the purification of sulphur comprising adding the impure sulphur and a washing liquid to an initially preformed pool of relatively pure molten sulphur, maintaining the washing liquid and molten sulphur phases as two separate liquid bodies of substantial extent with a relatively well defined interface therebetween, and causing a simultaneous agitation of the two liquids in such directions that all portions of the two liquids are repeatedly brought to the interface therebetween.

2. A process for the purification of sulphur comprising adding the impure sulphur and a washing liquid to an initially preformed pool of relatively pure molten sulphur, maintaining the washing liquid and molten sulphur phases as two separate liquid bodies of substantial extent with a relatively well defined interface therebetween, and causing a simultaneous circulation of the two liquids in such directions that all portions of the two liquids are repeatedly brought to the interface therebetween with a minimum amount of intermixture of the two liquids.

3. A process for the purification of sulphur comprising adding the impure sulphur and a washing liquid to an initially preformed pool of relatively pure molten sulphur, maintaining the washing liquid and molten sulphur phases as two separate liquid bodies of substantial extent with a relatively well defined interface therebetween, and causing a simultaneous circulation of the two liquids in such directions that all portions of the two liquids are repeatedly brought to the interface therebetween and caused to flow in the same direction at said contacting interface.

4. In a process for the purification of sulphur, the steps of adding the impure sulphur to an initially preformed pool of relatively pure molten sulphur with a heated washing liquid, maintaining the washing liquid and molten sulphur phases as two separate liquid bodies of substantial extent with a relatively well defined interface therebetween, and causing circulation of the molten sulphur and of the washing liquid such that all parts of the two liquids are repeatedly brought to the interface therebetween, while producing a vibration of the liquids at said interface.

5. In a process for the purification of sulphur, the steps of adding the impure sulphur to an initially preformed pool of relatively pure molten sulphur with a heated washing liquid of substantially different specific gravity from sulphur and immiscible therewith, maintaining the washing liquid and molten sulphur phases as two separate liquid bodies of substantial extent with a relatively well defined interface therebetween, inducing circulation of the molten sulphur and of the washing liquid such that all parts of the two liquids are repeatedly brought to the surface of separation, and causing a controlled vibration of the liquids at said surface.

6. A process for the purification of sulphur in a finely divided state comprising the steps of initially preforming a pool of relatively pure molten sulphur, adding the impure sulphur and a washing liquid having a lower surface tension than water, maintaining the washing liquid and molten sulphur phases as two separate liquid bodies of substantial extent with a relatively well defined interface therebetween, and causing a circulation of the washing liquid such that all portions of the washing liquid are repeatedly brought to the interface between the liquids.

7. A process for the purification of sulphur in a finely divided state comprising the steps of initially preforming a pool of relatively pure molten sulphur, adding the impure sulphur and a washing liquid which is heavier than molten sulphur and immiscible therewith, maintaining the washing liquid and molten sulphur phases as two separate liquid bodies of substantial extent with a relatively well defined interface therebetween, and causing a circulation of the washing liquid such that all portions of the washing liquid are repeatedly brought to the interface between the liquids.

8. A process for the purification of sulphur in a finely divided state comprising the steps of initially preforming a pool of relatively pure molten sulphur, adding the impure sulphur and a washing liquid which has a boiling point under normal atmospheric pressure higher than the melting point of sulphur and which is immiscible therewith, maintaining the washing liquid and molten sulphur phases as two separate liquid bodies of substantial extent with a relatively well defined interface therebetween, and causing a circulation of the washing liquid such that all portions of the washing liquid are repeatedly brought to the interface between the liquids.

9. A process for the purification of sulphur comprising agitating a suspension of impure sulphur in a washing liquid having a lower surface tension than water until there is obtained a practical separation into two layers, one consisting of substantially pure sulphur, and the other of the washing liquid and impurities.

10. A process for the purification of sulphur in a finely divided state comprising washing the impure sulphur at a temperature above the melting point of sulphur with an aqueous solution having a surface tension toward sulphur that is lower than the surface tension of water.

11. A process for the purification of sulphur comprising washing the impure sulphur while in the molten state with water to which has been added a substance to lower the surface tension.

12. A process for the purification of sulphur comprising washing the impure sulphur while in the molten state with an aqueous soap solution.

13. In a process for the purification of sulphur, the steps of dissolving the impure sulphur in a pool of molten sulphur adding a heated washing liquid having a surface tension which is lower than that of water, and which has an affinity for the impurities superior to that of the sulphur, maintaining the washing liquid and molten sulphur phases as two separate liquid bodies of substantial extent with a relatively well defined interface therebetween, and agitating the washing liquid adjacent said interface.

14. A process for the purification of sulphur comprising dissolving dry impure sulphur into an initially preformed molten pool of relatively pure sulphur while simultaneously washing with a washing liquid having a density greater than sulphur.

15. In a process for the purification of sulphur, the steps of adding the impure sulphur to a pool of molten sulphur with a heated washing liquid of lower surface tension than water which is immiscible with sulphur and which preferentially wets the impurities, maintaining the washing liquid and molten sulphur phases as two separate liquid bodies of substantial extent with a relatively well defined interface therebetween, and causing circulation of the molten sulphur and washing liquid such that all parts of the two liquids are repeatedly brought to the interface therebetween.

16. A process for the purification of sulphur comprising dissolving impure sulphur containing not more than a small amount of water into relatively pure molten sulphur, and thereafter washing the impure molten sulphur, the washing liquid and molten sulphur phases being maintained as two separate liquid bodies of substantial extent with a relatively well defined interface therebetween.

17. In a process for the purification of sulphur in a substantially dry, finely divided state, the steps of dissolving the dry impure sulphur in a pool of relatively pure molten sulphur, and thereafter washing out the impurities with a heated washing liquid while maintaining the washing liquid phase and the sulphur phase as two separate bodies of substantial extent.

18. In a process for the purification of sulphur in a substantially dry state, the steps of dissolving the dry impure sulphur in a pool of relatively pure molten sulphur, and thereafter washing the impurities out of the melt with a hot washing liquid having an affinity for the impurities superior to that of sulphur, the washing liquid and molten sulphur phases being maintained as two separate liquid bodies of substantial extent with a relatively well defined interface therebetween.

19. In a process for the purification of sulphur in a substantially dry state, the steps of dissolving the dry impure sulphur in a pool of molten sulphur, and thereafter washing the impurities out of the melt with a hot washing liquid having a surface tension lower than that of water, the washing liquid and molten sulphur phases being maintained as two separate liquid bodies of substantial extent with a relatively well defined interface therebetween.

20. In a process for the purification of sulphur in a substantially dry state, the steps of dissolving the dry impure sulphur in a pool of molten sulphur, and thereafter washing the impurities out of the melt with a hot washing liquid having a lower surface tension than water and preferentially wetting the impurities, the washing liquid and molten sulphur phases being maintained as two separate liquid bodies of substantial extent with a relatively well defined interface therebetween.

21. In a process for the purification of sulphur in a substantially dry state, the steps of dissolving the dry impure sulphur in a pool of molten sulphur, and thereafter washing out the impurities with a hot aqueous soap solution.

22. In a process for the purification of sulphur in a substantially dry state, the steps of dissolving the dry impure sulphur in a pool of relatively pure molten sulphur, and thereafter washing the impurities out of the melt with a hot washing liquid having a specific gravity greater than that of molten sulphur, the washing liquid and molten sulphur phases being maintained as two separate liquid bodies of substantial extent with a relatively well defined interface therebetween.

23. In a process for the purification of sulphur in a substantially dry state, the steps of dissolving the dry impure sulphur in a pool of relatively pure molten sulphur, and thereafter washing the impurities out of the melt with a hot washing liquid the boiling point of which is higher than the melting point of sulphur, the washing liquid and molten sulphur phases being maintained as two separate liquid bodies of substantial extent with a relatively well defined interface therebetween.

24. A substantially continuous process for the purification of sulphur in a substantially dry state comprising adding the dry impure sulphur to a pool of relatively pure molten sulphur overlying a washing liquid of greater density than sulphur, maintaining the washing liquid and molten sulphur phases as two separate liquid bodies of substantial extent with a relatively well defined interface therebetween, causing a circulation of the two liquids such that all parts thereof are repeatedly brought to the interface therebetween, and periodically discontinuing the addition of impure sulphur and withdrawing part of the pure sulphur.

25. A process for the purification of sulphur comprising dissolving the impure sulphur in an initially preformed pool of relatively pure molten sulphur, agitating with a washing liquid which preferentially wets the impurities, withdrawing the washing liquid, separating the impurities therefrom and withdrawing the added amount of sulphur, leaving a pool thereof for a repetition of the cycle.

26. In a process for the purification of sulphur the steps of mixing the impure sulphur with a washing liquid having a surface tension substantially lower than that of water, and thereafter bringing the mixture into intimate contact with an initially preformed pool of relatively pure molten sulphur.

27. A process for the purification of sulphur comprising bringing the impure sulphur in the molten state in contact with a suitable washing liquid so that all parts of both the sulphur and the washing liquid are brought repeatedly to the interface, the molten sulphur and washing liquid being maintained as two separate bodies of substantial extent with a relatively well defined interface therebetween and with a minimum of admixture.

ERNEST W. GUERNSEY.
RICHARD E. VOLLRATH.